United States Patent
Yang et al.

(10) Patent No.: US 11,782,497 B2
(45) Date of Patent: Oct. 10, 2023

(54) PERIPHERAL COMPONENT INTERCONNECT EXPRESS (PCIE) INTERFACE DEVICE AND METHOD OF OPERATING THE SAME

(71) Applicant: SK hynix Inc., Icheon-si (KR)

(72) Inventors: Ji Woon Yang, Icheon-si (KR); Yong Tae Jeon, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/522,827

(22) Filed: Nov. 9, 2021

(65) Prior Publication Data
US 2022/0382362 A1 Dec. 1, 2022

(30) Foreign Application Priority Data
Jun. 1, 2021 (KR) .................. 10-2021-0070686

(51) Int. Cl.
*G06F 1/3234* (2019.01)
*G06F 13/42* (2006.01)
(Continued)

(52) U.S. Cl.
CPC .......... *G06F 1/3253* (2013.01); *G06F 1/3206* (2013.01); *G06F 13/4022* (2013.01);
(Continued)

(58) Field of Classification Search
CPC .... G06F 1/3203; G06F 1/3206; G06F 1/3228; G06F 1/3253; G06F 1/3278;
(Continued)

(56) References Cited

U.S. PATENT DOCUMENTS 7,370,132 B1 5/2008 Huang et al.
9,146,892 B2 * 9/2015 Lindsay ................ G06F 1/3278
(Continued)

FOREIGN PATENT DOCUMENTS

CN 111124975 A 5/2020
KR 100807443 B1 2/2008
(Continued)

OTHER PUBLICATIONS

Horner, Rita. "Using PCI Express L1 Sub-States To Minimize Power Consumption In Advanced Process Nodes". Semiconductor Engineering. Jul. 10, 2014. Ret. from Internet Jan. 19, 2023. <https://semiengineering.com/using-pci-express-l1-sub-states-to-minimize-power-consumption-in-advanced-process-nodes>. (Year: 2014).*

(Continued)

*Primary Examiner* — Thomas J. Cleary
(74) *Attorney, Agent, or Firm* — Perkins Coie LLP

(57) ABSTRACT

A peripheral component interconnect express (PCIe) interface device is provided to include: a root complex configured to support a PCIe port, a memory connected to an input/output structure through the root complex, a switch connected to the root complex through a link and configured to transmit a transaction, and an end point connected to the switch through the link to transmit and receive a packet. The PCIe interface device may perform a link power management by changing a state of the link in response to a detection of an idle state of the link.

16 Claims, 11 Drawing Sheets

(51) Int. Cl.
  *G06F 13/40* (2006.01)
  *G06F 1/3206* (2019.01)
  *G06F 9/4401* (2018.01)

(52) U.S. Cl.
  CPC ........ *G06F 13/4282* (2013.01); *G06F 9/4418* (2013.01); *G06F 2213/0026* (2013.01); *Y02D 10/00* (2018.01)

(58) Field of Classification Search
  CPC ............... G06F 9/4418; G06F 13/4022; G06F 13/4282; G06F 2213/0026; Y02D 10/00
  See application file for complete search history.

(56) References Cited

U.S. PATENT DOCUMENTS

| | | | |
|---|---|---|---|
| 9,183,171 | B2 | 11/2015 | Iyer et al. |
| 9,454,213 | B2 | 9/2016 | Bharadwaj et al. |
| 9,467,120 | B1 | 10/2016 | Song |
| 9,760,311 | B1 | 9/2017 | Amir |
| 10,152,280 | B2 | 12/2018 | Ishiguro et al. |
| 10,963,035 | B2 * | 3/2021 | Mishra ................... G06F 13/102 |
| 11,307,638 | B2 * | 4/2022 | Li ............................ G06F 1/3278 |
| 2007/0047667 | A1 | 3/2007 | Shumarayev |
| 2007/0050653 | A1 * | 3/2007 | Verdun .................. G06F 1/3228 713/320 |
| 2008/0288798 | A1 * | 11/2008 | Cooper .................. G06F 1/3287 713/320 |
| 2009/0103444 | A1 | 4/2009 | Khatri et al. |
| 2009/0187683 | A1 | 7/2009 | Adar et al. |
| 2010/0115174 | A1 | 5/2010 | Akyol et al. |
| 2011/0173352 | A1 | 7/2011 | Sela et al. |
| 2012/0221882 | A1 | 8/2012 | Morrison et al. |
| 2013/0080660 | A1 | 3/2013 | Lee |
| 2013/0173837 | A1 | 7/2013 | Glaser et al. |
| 2014/0019654 | A1 | 1/2014 | Trivedi et al. |
| 2014/0032939 | A1 | 1/2014 | Jeddeloh |
| 2014/0108840 | A1 * | 4/2014 | Imao ...................... G06F 1/3278 713/323 |
| 2014/0195833 | A1 * | 7/2014 | Wang .................... G06F 1/3253 713/320 |
| 2014/0372777 | A1 | 12/2014 | Reller et al. |
| 2015/0081955 | A1 | 3/2015 | Vucinic et al. |
| 2015/0205539 | A1 | 7/2015 | Moon |
| 2016/0188510 | A1 | 6/2016 | Singh et al. |
| 2016/0210062 | A1 | 7/2016 | McCambridge |
| 2016/0216758 | A1 * | 7/2016 | Kachare ................ G06F 3/0634 |
| 2017/0083252 | A1 | 3/2017 | Singh |
| 2017/0269675 | A1 * | 9/2017 | Klacar ................... G06F 1/3206 |
| 2017/0293451 | A1 | 10/2017 | Pan et al. |
| 2017/0300263 | A1 | 10/2017 | Helmick |
| 2019/0042510 | A1 * | 2/2019 | Ngau .................... G06F 13/4027 |
| 2019/0250930 | A1 * | 8/2019 | Erez ...................... G06F 1/3281 |
| 2019/0324659 | A1 | 10/2019 | Benisty |
| 2019/0391936 | A1 | 12/2019 | Stalley |
| 2020/0125157 | A1 | 4/2020 | Kachare |
| 2020/0226091 | A1 | 7/2020 | Harriman |
| 2020/0310517 | A1 * | 10/2020 | Li ............................ G06F 9/466 |
| 2020/0371578 | A1 * | 11/2020 | Murali ................. G06F 13/4221 |
| 2020/0371579 | A1 * | 11/2020 | Selvam ............... G06F 13/4295 |
| 2021/0055866 | A1 * | 2/2021 | Fujimoto ............ G06F 13/4221 |
| 2022/0011965 | A1 * | 1/2022 | Heller ........................ G06F 1/08 |
| 2022/0197519 | A1 * | 6/2022 | Kuo ...................... G06F 3/0683 |
| 2022/0326885 | A1 | 10/2022 | Jeon et al. |
| 2022/0327073 | A1 | 10/2022 | Jeon |
| 2022/0327074 | A1 * | 10/2022 | Jeon .................... G06F 13/4221 |

FOREIGN PATENT DOCUMENTS

| | | |
|---|---|---|
| KR | 20100109446 A | 10/2010 |
| KR | 1020140113439 A | 9/2014 |
| KR | 1020160105209 A | 9/2016 |
| KR | 1020170124017 A | 11/2017 |
| KR | 20180049192 A | 5/2018 |
| KR | 20180121531 A | 11/2018 |
| WO | 2020155005 A1 | 8/2020 |

OTHER PUBLICATIONS

"PCI Express® Base Specification". Revision 4.0, Version 0.3. Feb. 19, 2014. PCI-SIG. (Year: 2014).*

* cited by examiner

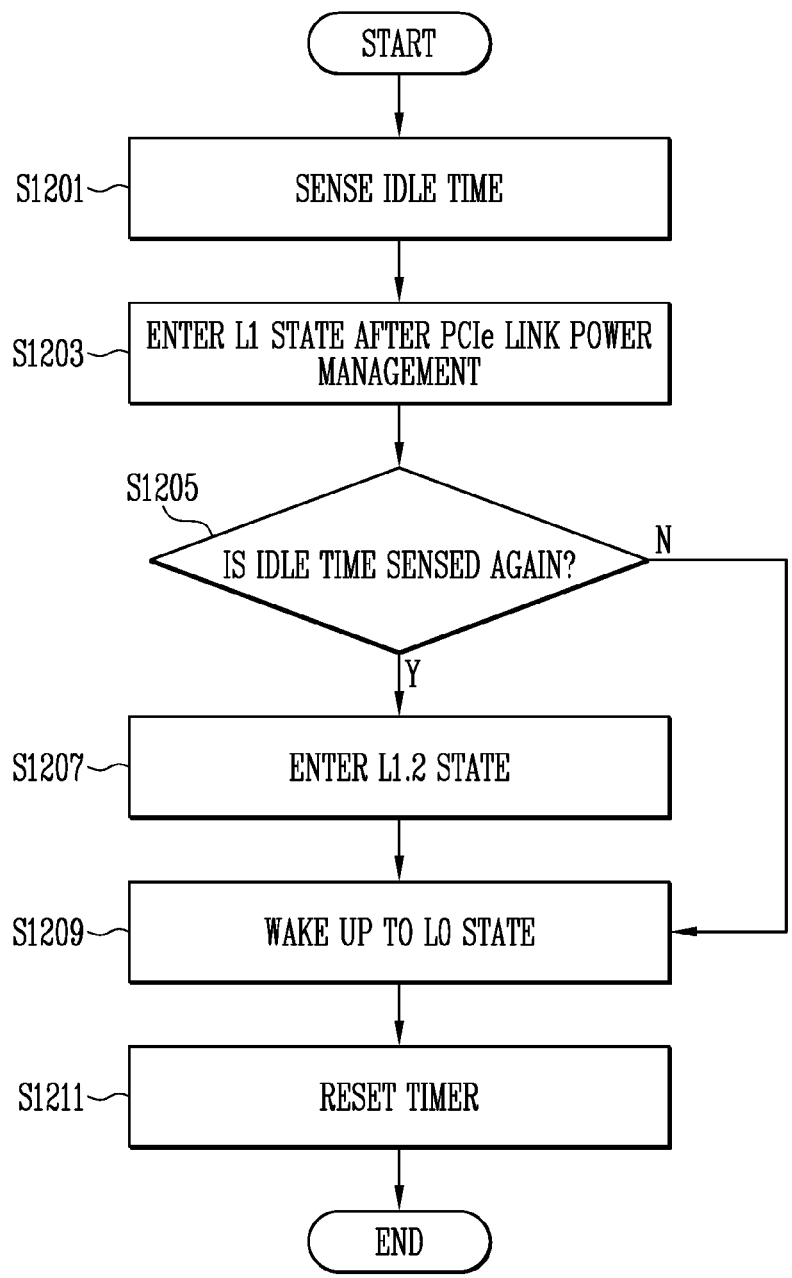

PERIPHERAL COMPONENT INTERCONNECT EXPRESS (PCIE) INTERFACE DEVICE AND METHOD OF OPERATING THE SAME

CROSS-REFERENCE TO RELATED APPLICATION

This patent document claims priority to and benefits of the Korean patent application number 10-2021-0070686, filed Jun. 1, 2021, which is incorporated herein by reference in its entirety.

TECHNICAL FIELD

The technology and implementations disclosed in this patent document relates to an electronic device, and more particularly, to a PCIe interface device and a method of operating the same.

BACKGROUND

A peripheral component interconnect express (PCIe) is a serial structure of interface for data communication. A PCIe-based storage device supports multi-port and multi-function. The PCIe-based storage device may be virtualized and non-virtualized, and may achieve quality of service (QoS) of a host I/O command through one or more PCIe functions.

Storage devices refer to electronic components that are configured to store data based on a control of a host device such as a computer or a smartphone. The storage device may include a memory device in which data is stored and a memory controller controlling the memory device. The memory device is classified into a volatile memory device and a non-volatile memory device depending on its capability to hold stored data in the absence of power.

A volatile memory device may store data only when power is supplied. Thus, such a volatile memory device loses its data in the absence of power. Examples of the volatile memory device includes a static random access memory (SRAM), or a dynamic random access memory (DRAM).

A non-volatile memory device is a device that can retain its data in the absence of power. Examples of the non-volatile memory device includes a read only memory (ROM), a programmable ROM (PROM), an electrically programmable ROM (EPROM), an electrically erasable and programmable ROM (EEPROM), or a flash memory.

SUMMARY

An embodiment of the disclosed technology provides a peripheral component interconnect express (PCIe) interface device for performing PCIe link power management in response to detecting an idle state of a PCIe link during a process of a non-volatile memory express (NVMe) command, and a method of operating the PCIE interface device.

According to an embodiment of the disclosed technology, a peripheral component interconnect express (PCIe) interface device may include a root complex configured to support a PCIe port, a memory connected to an input/output structure through the root complex, a switch connected to the root complex through a link and configured to transmit a transaction, and an end point connected to the switch through the link to transmit and receive a packet. The PCIe interface device may perform a link power management by changing a state of the link in response to a detection of an idle state of the link.

According to an embodiment of the disclosed technology, a method of operating a peripheral component interconnect express (PCIe) interface device is provided to comprise: detecting an idle state of a link configured to transmit and receive a packet based on a measurement of a period in which no packet is transmitted and received through the link, and performing a link power management by changing a state of the link in response to the detecting of the idle state of the link.

According to the present technology, a PCIe interface device for performing PCIe link power management when an idle state of a PCIe link is sensed during a process of an NVMe command, and a method of operating the same are provided.

BRIEF DESCRIPTION OF THE DRAWINGS

FIG. 12 is a diagram illustrating an operation of a PCIe interface device according to an embodiment of the disclosed technology.

DETAILED DESCRIPTION

Specific structural or functional descriptions of embodiments are illustrated only to describe examples of the embodiments of the disclosed technology. The embodiments of the disclosed technology may be carried out in various forms and should not be construed as being limited to the embodiments described in the present specification or application.

Figure 1:
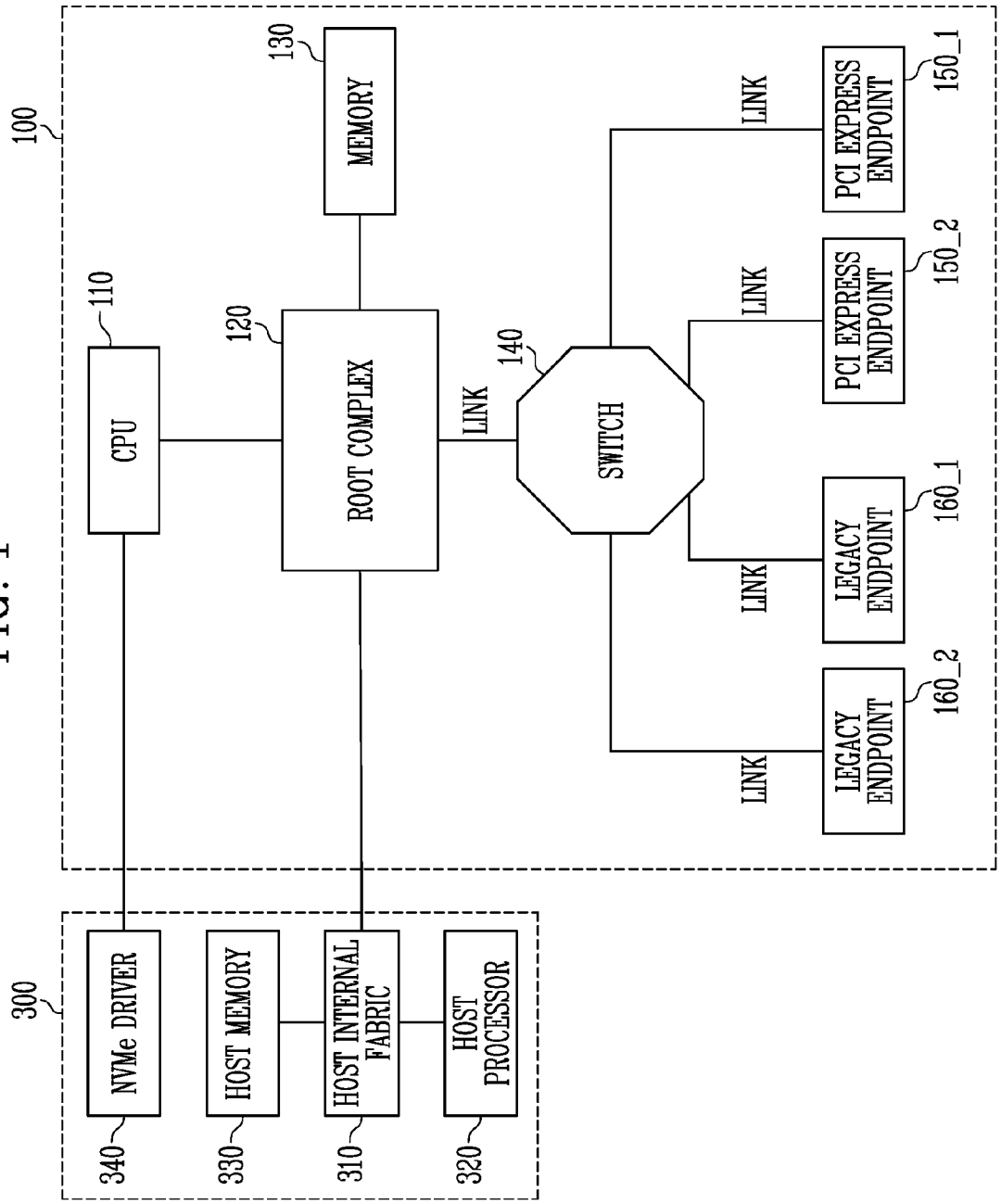
FIG. 1 is an example of a block diagram illustrating a peripheral component interconnect express (PCIe) interface system based on some implementations of the disclosed technology.

FIG. 1 is a block diagram illustrating a peripheral component interconnect express (PCIe) interface system.

Referring to FIG. 1, a PCIe interface device 100 of FIG. 1 may include a central processing unit 110, a root complex 120, a memory 130, a switch 140, PCIe end points 150_1 and 150_2, and legacy end points 160_1 and 160_2. In addition, a host 300 of FIG. 1 may include a host internal fabric 310, a host processor 320, a host memory 330, and an NVMe driver 340.

The root complex 120 is an interface device that connects the CPU 110, the memory 130 and the host 300 to the PCIe devices and components. In FIG. 1, the root complex 120 may be connected to the switch 140 through a link (LINK). In addition, the switch 140 may be connected to each of the PCIe end points 150_1 and 150_2 and the legacy end points 160_1 and 160_2 through the link (LINK). The link (LINK) may be configured of at least one lane.

In an embodiment, the root complex 120 may connect the central processing unit 110 and the memory 130 to an input/output hierarchy structure (I/O hierarchy). For example, the root complex 120 may support a PCIe port. Thus, the root complex 120 may support a root port that may be connected to an input/output device (I/O device).

In some implementations, the root complex 120 may support routing between hierarchies of each configuration included in the PCIe interface device 100. Here, the routing may mean an operation of selecting a path from a transmission side to a reception side in data communication. The routing may be performed based on any one of a method of setting the path from the transmission side to the reception side in advance or selecting the most efficient path according to a state of a system or a network.

In some implementations, the root complex 120 may support an input/output request. The root complex 120 may support generation of a configuration request. The root complex 120 may support lock semantics as a completer. The root complex 120 may request generation of a lock request as a requester.

In an embodiment, the root complex 120 may divide a packet transmitted between hierarches into smaller units during routing. In addition, the root complex 120 may generate the input/output request.

In an embodiment, the switch 140 may be configured of two or more logical PCI-to-PCI bridges. Each of the two or more logical PCI-to-PCI bridges may be connected to an upstream port or a downstream port.

The switch 140 may transmit a transaction using a PCI bridge mechanism (address-based multicasting method). At this time, the switch 140 may transmit all types of transaction layer packets (TLPs) through the upstream port and the downstream port. In addition, the switch 140 may support a locked request. Each port of the enabled switch 140 may support flow control. When competition occurs in the same virtual channel, the switch 140 may arbitrate in a round robin or weighted round robin method.

In an embodiment, differently from the root complex 120, the switch 140 may not divide the packet transmitted between the hierarches into smaller units.

In an embodiment, the PCIe end points 150_1 and 150_2 and the legacy end points 160_1 and 160_2 may serve as the requester or the completer of a PCIe transaction. The TLP transmitted and received by the PCIe end points 150_1 and 150_2 and the legacy end points 160_1 and 160_2 may provide a configuration space header. In addition, the PCIe end points 150_1 and 150_2 and the legacy end points 160_1 and 160_2 may provide a configuration request as the completer.

In an embodiment, the PCIe end points 150_1 and 150_2 and the legacy end points 160_1 and 160_2 may be distinguished according to a size of a memory transaction. For example, when a memory transaction exceeding 4 GB is possible, an end point may be the PCIe end points 150_1 and 150_2, and when a memory transaction exceeding 4 GB is impossible, the end point may be the legacy end points 160_1 and 160_2. The PCIe end points 150_1 and 150_2 may not generate the input/output request, but the legacy end points 160_1 and 160_2 may provide or generate the input/output request.

In an embodiment, the PCIe end points 150_1 and 150_2 or the legacy end points 160_1 and 160_2 may transmit and receive the TLP to and from the switch 140.

In an embodiment, the switch 140 may transmit the TLP received from the PCIe end points 150_1 and 150_2 or the legacy end points 160_1 and 160_2 to the root complex 120.

In an embodiment, the root complex 120 may transmit and receive the TLP to and from the PCIe end points 150_1 and 150_2 or the legacy end points 160_1 and 160_2 through the switch 140. The root complex 120 may transmit the TLP received from the PCIe end points 150_1 and 150_2 or the legacy end points 160_1 and 160_2 to the central processing unit 110 or the memory 130.

In an embodiment, the host processor 320 and the host memory 330 included in the host 300 may be connected to the root complex 120 through the host internal fabric 310.

In an embodiment, the host processor 320 may control a write operation or a read operation to be performed on a non-volatile memory express (NVMe) device connected to each of the PCIe end points 150_1 and 150_2 or the legacy end points 160_1 and 160_2. Here, the NVMe device may be a solid state drive (SSD). In addition, the host processor 320 may store information necessary for controlling the write operation or the read operation to be performed on the NVMe device in the host memory 330.

In an embodiment, the NVMe driver 340 may be connected to the central processing unit 110 and allow the host 300 to control the NVMe device through the PCIe interface device 100.

In an embodiment, the PCIe interface device 100 may enter PCIe link power management (active-state power management ASPM) while processing a read command or a write command. Here, the PCIe link power management may refer to an operation or a policy for changing power consumption of the PCIe interface device 100 to a low power state by changing a state of the link in a state in which the packet is not transmitted or received through the link (LINK) connecting the configurations included in the PCIe interface device 100 or when the transmission and reception of the packet is temporarily stopped.

When the PCIe interface device 100 does not complete the process of the read command or the write command and enters an L1.2 state, that is, PCIe link power management (ASPM), the PCIe interface device 100 may enter the PCIe link power management (ASPM) while processing the read command or the write command, by waking up in the L1.2 state by itself after processing the read command or the write command.

Therefore, the PCIe interface device 100 may enter the PCIe link power management even in a case where a QUEUE remains in the entry, or an unprocessed command exists including a case where the entry does not exist in the SUBMISSION QUEUE and COMPLETION QUEUE included in the host memory 330 and the unprocessed command does not exist in the PCIe interface device 100. That is, the PCIe interface device 100 may enter the PCIe link power management in a case where data corresponding to an unprocessed command among the configurations included in the PCIe interface device 100 exits in the memory 130 or the central processing unit 110, the root complex 120, or the switch 140 is operating.

Since the PCIe interface device 100 may enter the PCIe link power management in not only a case where the entry does not exist in the SUBMISSION QUEUE and the COMPLETION QUEUE and the unprocessed command does not exist in the PCIe interface device 100 but also a case where the QUEUE exists in the entry or the unprocessed command exists, a command process may be quickly executed. In addition, by quickly executing the command process, a size of PCIe link power may be reduced, thereby affecting active-state power of the PCIe interface device 100.

In the disclosed technology, a method, in which the PCIe interface device 100 senses or detects the idle state of the link by itself and enters the PCIe link power management by itself when the idle state of the link is sensed or detected, even in a case where the unprocessed command exists inside the PCIe interface device 100, is presented. Furthermore, a method of ending the PCIe link power management by itself when a time point when data is required to be transmitted to the host 300 again after entering the PCIe link power management is presented.

Figure 2:
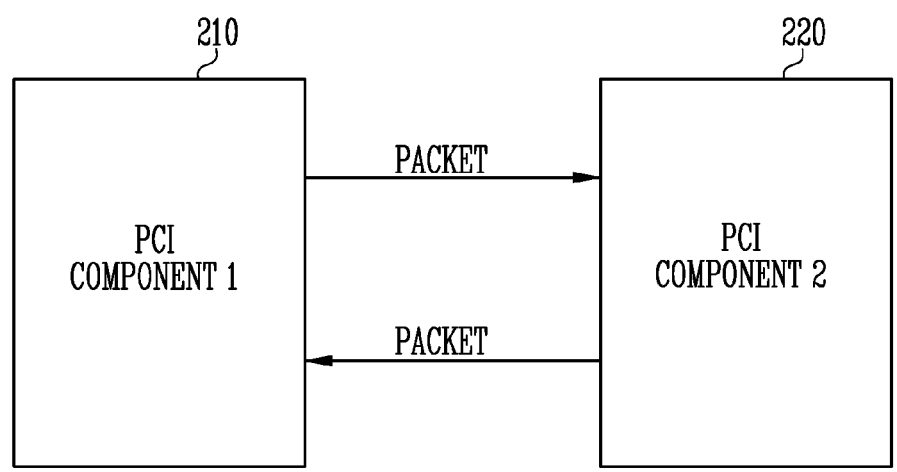
FIG. 2 is an example of a diagram illustrating transmission of a packet between configurations included in a PCIe interface device based on some implementations of the disclosed technology.

FIG. 2 is a diagram illustrating transmission of the packet between configurations included in the PCIe interface device.

Referring to FIGS. 1 and 2, PCI components PCI COMPONENT 1 and 2 of FIG. 2 may be any one of the root complex 120, the switch 140, the PCIe end points 150_1 and 150_2, and the legacy end points 160_1 and 160_2 of FIG. 1. That is, the PCI components PCI COMPONENT 1 and 2 of FIG. 2 may be any one of components connected by the link (LINK). Here, the link (LINK) may be configured of at least one lane.

In an embodiment, the PCI components PCI COMPONENT 1 and 2 may transmit and receive a packet PACKET through the link (LINK). Each of the PCI components PCI COMPONENT 1 and 2 may perform a function of a transmitter (TX) transmitting the packet PACKET or a receiver (RX) receiving the packet PACKET.

In an embodiment, the packet PACKET may be an information transmission unit, and may be configured of a selective TLP prefix, a header, and a data payload.

In an embodiment, a packet PACKET that does not need to be cached is not snooped, thereby reducing latency. When dependence does not exist between transactions, operation performance of the packet PACKET may be improved by changing ordering. In addition, the operation performance of the packet PACKET may be improved by changing the ordering based on an ID.

Figure 3:
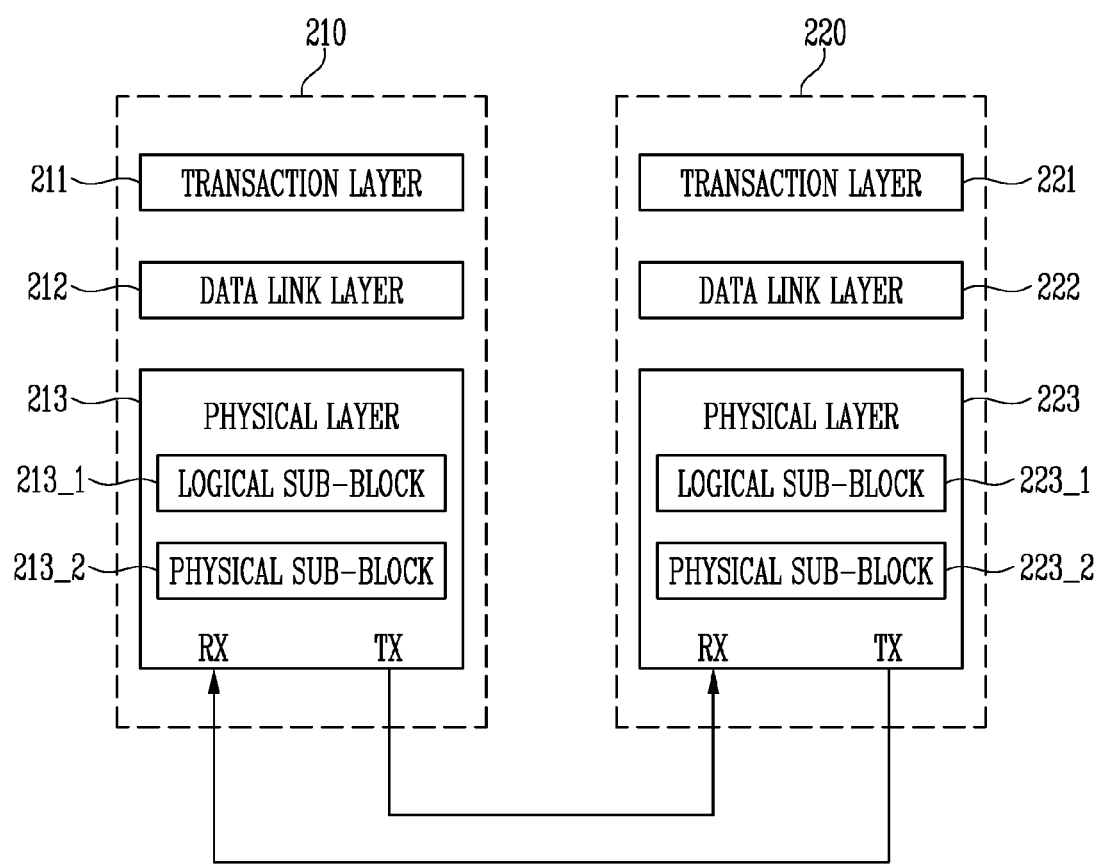
FIG. 3 is an example of a diagram illustrating a layer included in each of configurations included in a PCIe interface device based on some implementations of the disclosed technology.

FIG. 3 is a diagram illustrating a layer included in each of the configurations included in the PCIe interface device.

Referring to FIGS. 2 and 3, FIG. 3 shows the layers included in the PCI components PCI COMPONENT 1 and 2 of FIG. 2, respectively. In FIG. 3, the PCI components PCI COMPONENT 1 and 2 may be configured of transaction layers 211 and 221, data link layers 212 and 222, and physical layers 213 and 223, respectively. The physical layers 213 and 223 may include logical sub blocks 213_1 and 223_1 and physical sub blocks 213_2 and 223_2.

In an embodiment, the transaction layers 211 and 221 may combine or disassemble a transaction layer packet (TLP). Here, the TLP may be used to process a transaction of read and write, that is, a specific event.

The transaction layers 211 and 221 may control a credit-based flow. In addition, the transaction layers 211 and 221 may support addressing of various formats according to a transaction type. For example, the transaction layers 211 and 221 may support addressing for a memory, input/output, a configuration, or a message.

In an embodiment, the transaction layers 211 and 221 may perform initialization and configuration functions. Specifically, the transaction layers 211 and 221 may store link setting information generated by a processor or a management device. In addition, the transaction layers 211 and 221 may store a link property related to a bandwidth and a frequency determined in the physical layers 213 and 223.

In an embodiment, the transaction layers 211 and 221 may generate and process the packet. Specifically, the TLP requested from a device core may be generate and the received TLP may be converted into data payload or state information. In addition, when the transaction layers 211 and 221 support end-to-end data integrity, transaction layers 211 and 221 may generate a cyclic redundancy code (CRC) and update the CRC to a header of the TLP.

In an embodiment, the transaction layers 211 and 221 may perform flow control. Specifically, the transaction layers 211 and 221 may track a flow control credit for the TLP in the link. In addition, the transaction layers 211 and 221 may periodically receive a transaction credit state through the data link layers 212 and 222. The transaction layers 211 and 221 may control TLP transmission based on flow control information.

In an embodiment, the transaction layers 211 and 221 may manage power. For example, the transaction layers 211 and 221 may manage power according to an instruction of system software. In some implementations, the transaction layers 211 and 221 may perform autonomous power management according to an instruction of hardware in a state in which the power is turned on.

In an embodiment, the transaction layers 211 and 221 may identify a virtual channel mechanism and a traffic class for a specific class of an application. The transaction layers 211 and 221 may provide an independent logical data flow through a specific physical resource. In addition, the transaction layers 211 and 221 may apply an appropriate service policy in a method of providing different ordering through packet labeling.

In an embodiment, the data link layers 212 and 222 may be responsible for link management, data integrity, error detection, and error correction. The data link layers 212 and 222 may transmit the TLP, which is to be transmitted, to the physical layers 213 and 223, by assigning a data protection code and a TLP sequence number. In some implementations, the data link layers 212 and 222 may check integrity of the TLP received from the physical layers 213 and 223 and transmit the integrity of the TLP to the transaction layers 211 and 221.

When the data link layers 212 and 222 sense or detect an error of the TLP, the data link layers 212 and 222 may receive a TLP in which an error does not exist or request the physical layers 213 and 223 to retransmit the TLP until it is determined that the link is in a fail state. The data link layers 212 and 222 may generate and consume a data link layer packet (DLLP) used for the link management.

In an embodiment, the data link layers 212 and 222 may exchange reliable information. In addition, the data link layers 212 and 222 may manage initialization and power. Specifically, the data link layers 212 and 222 may transmit a power state request of the transaction layers 211 and 221 to the physical layers 213 and 223. In addition, the data link layers 212 and 222 may transmit information on activation-or-not, reset, connection release, and power management state to the transaction layers 211 and 221.

In an embodiment, the data link layers 212 and 222 may perform data protection, error checking, and retry. Specifically, the data link layers 212 and 222 may generate the CRC for the data protection. In addition, the data link layers 212 and 222 may store the TLP to enable retry on the transmitted TLP. The data link layers 212 and 222 may check the TLP, transmit a retry message, report an error, and display an error for logging.

In an embodiment, the physical layers 213 and 223 may include a configuration for an interface operation such as a driver, an input buffer, a parallel-to-serial or serial-to-parallel converter, and a phase locked loop (PLL).

In an embodiment, the physical layers 213 and 223 may convert a packet received from the data link layers 212 and 222 into a serialized format and transmit the packet. In addition, the physical layers 213 and 223 may set the bandwidth and frequency according to compatibility with a device connected to another side of the link. In order to communicate data serially, the physical layers 213 and 223 may convert the packet from parallel to serial and convert the packet from serial to parallel again. That is, the physical layers 213 and 223 may perform a function of a serializer or deserializer.

In an embodiment, the physical layers 213 and 223 may perform interface initialization, maintenance, and state tracking. Specifically, the physical layers 213 and 223 may manage power by connection between components. In addition, the physical layers 213 and 223 may negotiate a bandwidth and lane mapping between the components and reverse a polarity of the lane.

The physical layers 213 and 223 may generate a symbol and a special ordered set. In addition, the physical layers 213 and 223 may transmit and align the generated symbol.

In an embodiment, the physical layers 213 and 223 may serve as a packet transmitter or receiver between PCI components. That is, the physical layers 213 and 223 may convert the packet received through the transaction layers 211 and 221 and the data link layers 212 and 222 and transmit the packet to another PCI component, and convert the packet received from another PCI component and transmit the packet to the transaction layers 211 and 221 through the data link layers 212 and 222.

In an embodiment, the logical sub blocks 213_1 and 223_1 included in the physical layers 213 and 223 may be configured of two sections. One of the two sections may be a transmission section, and may be a section for preparing to transmit information transmitted from the data link layers 212 and 222 to the physical sub blocks 213_2 and 223_2. The other of the two sections may be a receiving section, and may be a section for identifying information and preparing an output of the information to the data link layers 212 and 222 before outputting the information to the data link layers 212 and 222.

The physical sub blocks 213_2 and 223_2 included in the physical layers 213 and 223 may be electrical sub blocks, and may support a commonly or individually independent reference clock structure. In addition, the physical sub blocks 213_2 and 223_2 may reduce swing for a low power link operation, sense or detect a receiver in a band, and sense or detect an electrical idle state.

Figure 4:
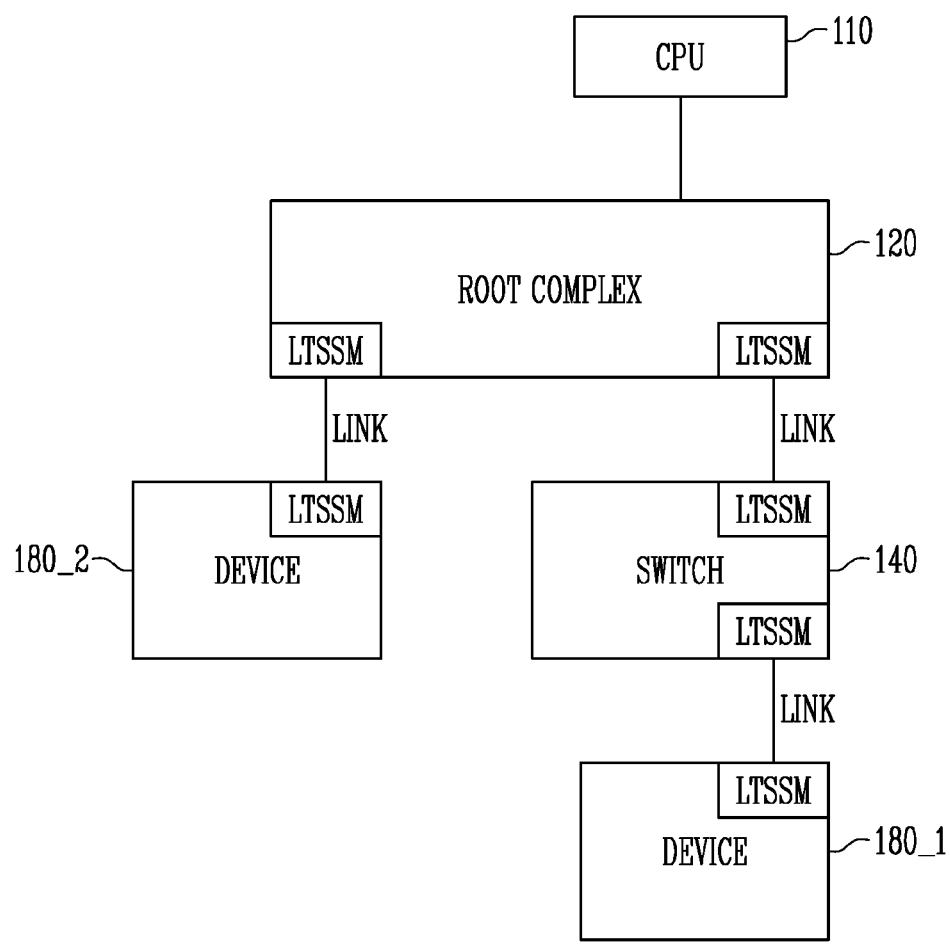
FIG. 4 is an example of a diagram illustrating a link training & status state machine (LTSSM) based on some implementations of the disclosed technology.

FIG. 4 is a diagram illustrating a link training & status state machine (LTSSM).

Referring to FIGS. 1 and 4, FIG. 4 shows the central processing unit 110, the root complex 120, the switch 140, and devices 180_1 and 180_2 connected to an end point among the configurations included in the PCIe interface device 100 of FIG. 1. Each component of FIG. 4 may include the LTSSM. The LTSSM may exchange Training Sequences (ex. TS1 and TS2) to negotiate a number of link parameters, such as a polarity of the lane configuring the link connecting each component, the number of links or lanes, equalization, and data transmission speed.

In an embodiment, the LTSSM may be a hardware-based processor controlled by the physical layers 213 and 223 of FIG. 3 in a PCIe environment. For a normal operation, the LTSSM may establish and initialize the link and a port between each component to enable packet transmission. The link may have any one of 11 states such as Detect and Polling, and each state may have a sub state.

A flow between various states that the link may have is described in more detail with reference to FIG. 5.

In an embodiment, in order to configure the port for connecting each component, a separate LTSSM may be required for each individual link. For example, in order to configure a port for connecting the root complex 120 and the device 180_2, each of the root complex 120 and the device 180_2 may include the LTSSM. In addition, in order to configure a port for connecting the root complex 120 and the switch 140, each of the root complex 120 and the switch 140 may include the LTSSM. Furthermore, in order to configure a port for connecting the switch 140 and the device 180_1, each of the switch 140 and the device 180_1 may include the LTSSM.

In an embodiment, among ports of the switch 140, a port close to the root complex 120 may be an upstream port, and a port far from the root complex 120 may be a downstream port. The upstream port and the downstream port may synchronize an LTSSM transition by exchanging the Training Sequences (ex. TS1 and TS2) with the root complex 120 and the device 180_1, respectively. At this time, in synchronizing the LTSSM transition, the upstream port and the downstream port may be independent of each other and may or may not be influenced by each other.

In an embodiment, the central processing unit 110 may not be affected by the LTSSM between each component. Therefore, in a case of a link down that is not intended by the host, a problem such as a blue screen may occur.

Figure 5:
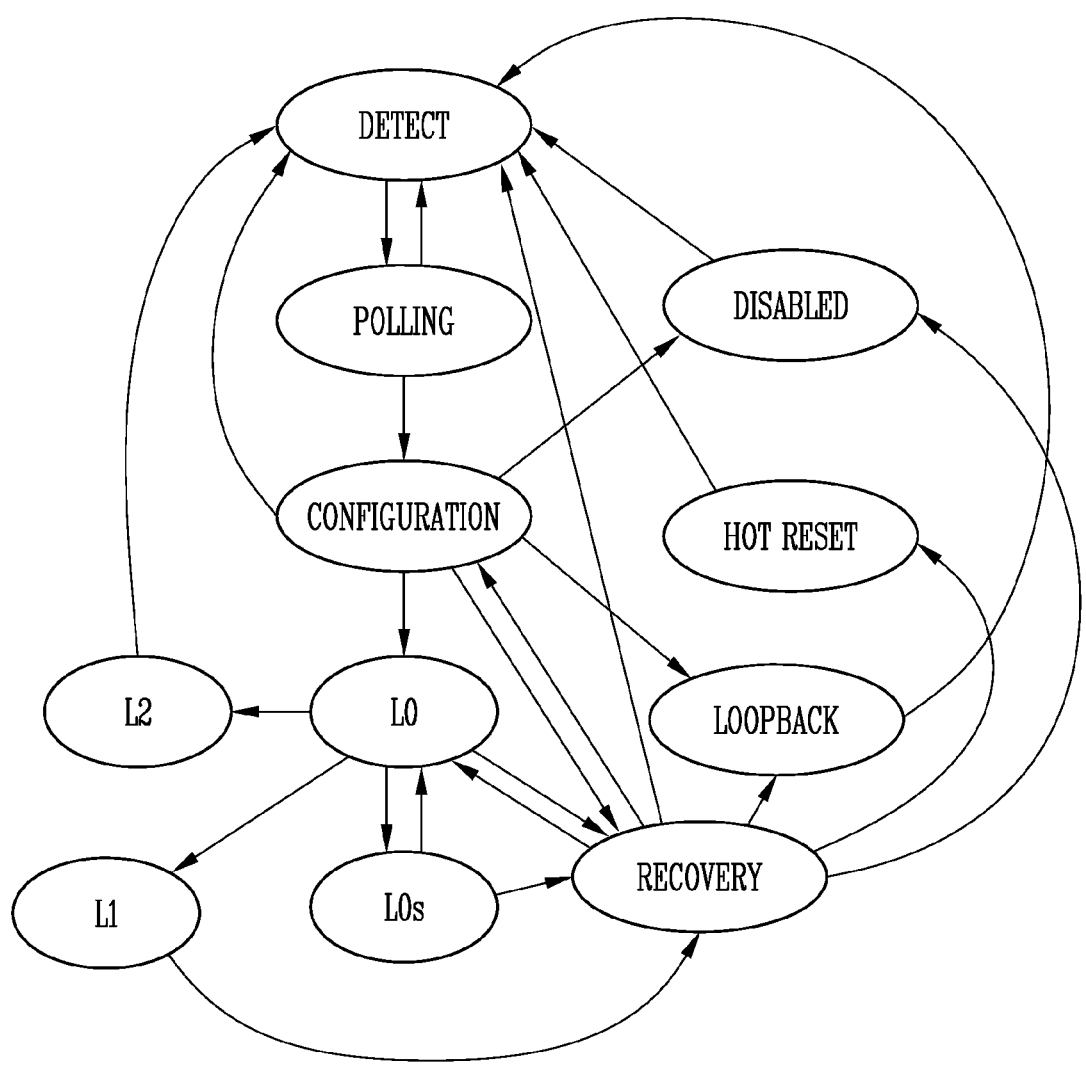
FIG. 5 is an example of a diagram illustrating each step of a LTSSM based on some implementations of the disclosed technology.

FIG. 5 is a diagram illustrating each step of the LTSSM.

Referring to FIGS. 4 and 5, FIG. 5 shows each step for synchronizing the LTSSM transition of FIG. 4.

In an embodiment, in a DETECT step, a link connected at both ends of the PCI components PCI COMPONENT 1 and 2 of FIG. 2 is sensed or detected. Thus, in the DETECT step, searching for a physically connected lane is performed.

The DETECT step may be an initial step of the LTSSM and may be entered after reset or during booting. In some implementations, in the DETECT step, all logic, ports and registers may be reset. The DETECT step may be entered in response to receiving an instruction. The LTSSM may proceed from the DETECT step to a POLLING step.

In an embodiment, in the POLLING step, a lane capable of data communication is among the sensed or detected lanes is identified. In some implementations, in the POLLING step, a clock of the both ends of the PCI components PCI COMPONENT 1 and 2 is synchronized, a polarity of the lane (whether it is D+ or D−) is checked, or/and a data transmission speed used by the lane is checked. In some implementations, in the POLLING step, a boundary between consecutive bits in data is checked. In an embodiment, the LTSSM may proceed from the POLLING step to a CONFIGURATION step.

In an embodiment, in the CONFIGURATION step, a connection state of the lane is checked. For example, in the CONFIGURATION step, a lane width through which data communication is possible is confirmed. In some implementations, in the CONFIGURATION step, a bit indicated by PAD of the training sequences is changed to a negotiated number, and negotiation for maximum performance of both devices may be performed. In the CONFIGURATION step, both of a transmitter and a receiver may transmit or receive data at negotiated data transmission/reception speed. In some implementations, in the CONFIGURATION step, Lane to Lane De-skew, in which parallel bit streams arrive at different devices at different times from a plurality of lanes may be solved.

In an embodiment, the LTSSM may proceed from the CONFIGURATION step to the DETECT step, an L0 step, a RECOVERY step, a LOOPBACK step, or a DISABLED step.

In an embodiment, in the L0 step, data and a control packet may be normally exchanged (e.g., transmitted and received). Thus, in the L0 step, the TLP and the DLLP may be transmitted and received. In some implementations, power management states may be started in the L0 step. The L0 step may be a normal operational state. The L0 step may be a fully active state.

In an embodiment, the LTSSM may proceed from the L0 step to an L1 step, an L2 step, an L0s step, or the RECOVERY step.

In an embodiment, each of the L0s step, the L1 step, and the L2 step may be a low power state step.

In some implementations, the L0s step may be a sub step of the L0 step. In the L0s step, the link may quickly proceed to a low power state and recover without passing through the RECOVERY step. In order to proceed from the L0s step to the L0 step, bit lock, symbol lock, and Lane to Lane De-skew may be reset. At this time, the transmitter and receiver of both end ports are not required to be in the L0s step simultaneously. The LTSSM may proceed from the L0s step to the L0 step or the RECOVERY step. The L0s step may be a power saving state. The L0s step may be an idle or standby state of some functions.

In some implementations, the L1 step may have a speed for returning to the L0 step lower than that of the L0s step, but can save more power through an additional resume latency as compared to the L0 step in the L1 step. The L1 step may be entered through the ASPM or power management software. The ASPM may refer to a policy of changing the link to a low power state when a device connected through PCIe is not used, and the power management software may refer to a policy of changing a device connected through the PCIe to a low power state. The L1 step may be a low power standby state.

The entry into the L1 step may proceed after receiving an electrical idle ordered set (EIOS) according to an instruction received from the data link layers 212 and 222 of FIG. 3. The LTSSM may proceed from the L1 step to the RECOVERY step.

In some implementations, in the L2 step, maximum power may be conserved, and the transmitter and receiver of the device connected through the PCIe may be blocked. Power and a clock may not be guaranteed in the L2 step, but AUX power may be used. The entry into the L2 step may proceed after receiving the EIOS by the instruction from the data link layers 212 and 222 of FIG. 3. The LTSSM may proceed from the L2 step to the DETECT step. The L2 step may be an active power saving state. The L2 step may be a low power sleep state in which power is not supplied to most of functions.

In an embodiment, the RECOVERY step may be performed when an error occurs in the L0 step, and may proceed to the L0 step again after error recovery. In some implementations, the RECOVERY step may be performed when returning from the L1 step to the L0 step, and operate as a transited step when entering the LOOPBACK step, a HOT RESET step, or the DISABLED step.

In the RECOVERY step, bit lock, symbol lock or block alignment, and lane to lane de-skew may be reset. In addition, in the RECOVERY step, a speed of the lane may be changed.

In an embodiment, the LTSSM may proceed from the RECOVERY step to the L0 step, the CONFIGURATION step, the DETECT step, the LOOPBACK step, the HOT RESET step, or the DISABLED step.

In an embodiment, the LOOPBACK step may be performed for a test, and may be entered when measuring a bit error rate. In the LOOPBACK step, the link may be reset, and bit 2 of a Training Control field of the Training Sequences (ex. TS1 and TS2) may be used, and/or the receiver may retransmit all received packets. The LTSSM may proceed to the DETECT step after measuring the bit error rate in the LOOPBACK step.

In an embodiment, in the HOT RESET step, the link is reset, and bit 0 of the Training Control field of the Training Sequences (ex. TS1 and TS2) may be used. The LTSSM may proceed from the HOT RESET step to the DETECT step.

In an embodiment, the DISABLED step may allow the transmitter to be in an electrical idle state when the receiver is in a low impedance state. In the DISABLED step, the link may be deactivated until the electrical idle state is ended. The DISABLED step may use bit 1 of the Training Control field of the Training Sequences (ex. TS1 and TS2). When receiving an instruction from an upper step, the LTSSM may proceed to the DISABLED step. The LTSSM may proceed from the DISABLED step to the DETECT step.

In FIG. 5, link-up may indicate transition from the DETECT step to the L0 step through the POLLING step and the CONFIGURATION step, and link-down may indicate transition to the DETECT step again.

In some implementations, the LTSSM may set a link-up register value for each step. For example, a state in which the link-up register is '1' may be a link-up state, and a state in which the link-up register is '0' may be a link-down state. When the LTSSM proceeds to the L0 step initially, the link-up register may be set to '1'.

In some implementations, the link-up register corresponding to the DETECT step, the POLLING step, the CONFIGURATION step, the LOOPBACK step, the HOT RESET step, and the DISABLED step may be set to '0', and the link-up register corresponding to the L0 step, the L0s step, the L1 step, and the L2 step may be set to '1'.

In an embodiment, during the link-down, data may be flushed, and a PCIe register and an NVMe register may be reset. Therefore, the host is required to initialize the PCIe register and the NVMe register. In a case of a link-down intended by the host, the host may initialize the PCIe register and the NVMe register.

In a case of a sudden link-down that is not intended by the host, for example, in a case of a failure of data transmission/reception speed change, a failure of a lane change, a failure of a low power end, or others, an LTSSM timeout may occur, and thus the LTSSM may transit to the DETECT step. At this time, since the sudden link-down that is not intended by the host is a link-down between two ports, an OS and the NVMe driver may not recognize this. Therefore, the host may attempt to access a device without initializing the PCIe and the NVMe, and thus undesired situations, for example, a blue screen, a stop of a host operation, may occur due to reset values.

Figure 6:
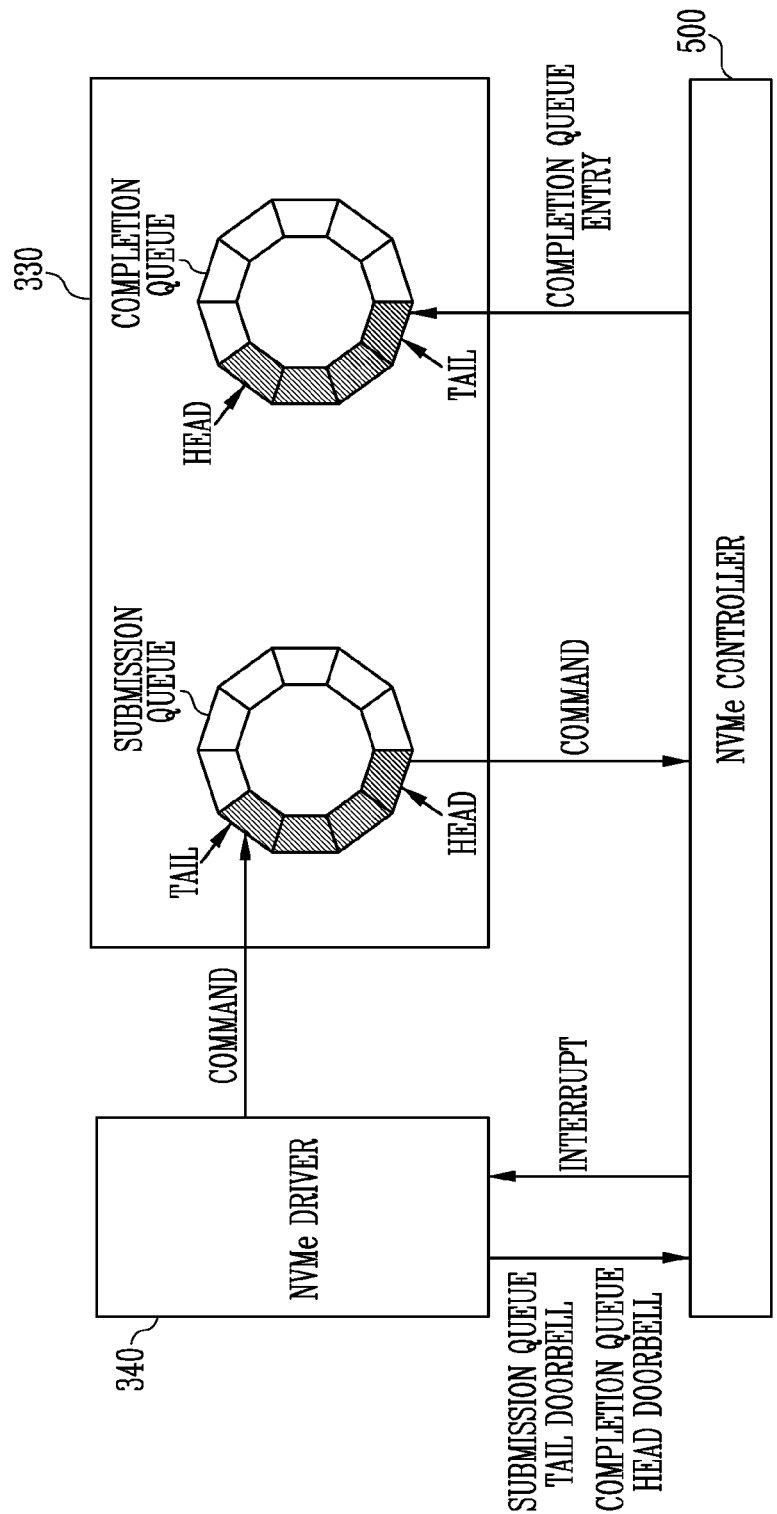
FIG. 6 is an example of a diagram illustrating a process for processing a command in a non-volatile memory express (NVMe) based on some implementations of the disclosed technology.

FIG. 6 is a diagram illustrating a process for processing a command in the NVMe.

Referring to FIGS. 1 and 6, FIG. 6 shows a process in which the command is executed on the NVMe device connected to each of the PCIe end points 150_1 and 150_2 or the legacy end points 160_1 and 160_2 through the NVMe driver 340 and the host memory 330 included in the host 300 of FIG. 1. The NVMe device may include an NVMe controller 500. In FIG. 6, the host memory 330 may include a SUBMISSION QUEUE (SQ) and a COMPLETION QUEUE (CQ).

In an embodiment, the NVMe driver 340 may transmit the command COMMAND to be executed on the NVMe device to the SUBMISSION QUEUE. The SUBMISSION QUEUE may queue the command COMMAND received from the NVMe driver 340. For example, the host memory 330 may sequentially queue the received command from HEAD to TAIL of the SUBMISSION QUEUE.

When the command COMMAND is queued in the SUBMISSION QUEUE, the NVMe driver 340 may output a SUBMISSION QUEUE TAIL DOORBELL signal to the NVMe controller 500. The NVMe controller 500 may receive the SUBMISSION QUEUE TAIL DOORBELL signal and store SUBMISSION QUEUE TAIL ENTRY POINTER in a register. Here, the SUBMISSION QUEUE TAIL ENTRY POINTER may be an indicator indicating the command queued in a TAIL portion among the commands queued in the SUBMISSION QUEUE. Thus, the NVMe controller 500 may store the SUBMISSION QUEUE TAIL ENTRY POINTER in the register to identify a new command output from the host memory 330.

Thereafter, the NVMe controller 500 may fetch the command from the host memory 330 (COMMAND FETCH). Thus, the NVMe controller 500 may receive the commands queued in the SUBMISSION QUEUE. The NVMe controller 500 may perform an operation corresponding to the received commands.

In an embodiment, after the NVMe controller 500 performs the operation corresponding to the commands, COMPLETION QUEUE ENTRY may be transmitted to the host memory 330. The COMPLETION QUEUE ENTRY may include information on the most recently executed command by the NVMe controller 500. The host memory 330 may queue the received COMPLETION QUEUE ENTRY in the COMPLETION QUEUE. For example, the host memory 330 may sequentially queue the received COMPLETION QUEUE ENTRY from the HEAD to the TAIL of the COMPLETION QUEUE.

Thereafter, the NVMe controller 500 may output an INTERRUPT signal to the NVMe driver 340. The INTERRUPT signal may be a signal indicating that the COMPLETION QUEUE ENTRY is queued in the COMPLETION QUEUE.

When receiving the INTERRUPT signal, the NVMe driver 340 may perform an operation based on the COMPLETION QUEUE ENTRY of the COMPLETION QUEUE. When the NVMe driver 340 completes the operation, the NVMe driver 340 may output a COMPLETION QUEUE HEAD DOORBELL signal to the NVMe controller 500. The NVMe controller 500 may receive the COMPLETION QUEUE HEAD DOORBELL signal and store COMPLETION QUEUE HEAD ENTRY POINTER in the register. Here, the COMPLETION QUEUE HEAD ENTRY POINTER may be an indicator indicating an entry queued in a HEAD portion among entries queued in the COMPLETION QUEUE. Thus, the NVMe controller 500 may store the COMPLETION QUEUE HEAD ENTRY POINTER in the register in order to identify the command of which the operation is completed.

Figure 7:
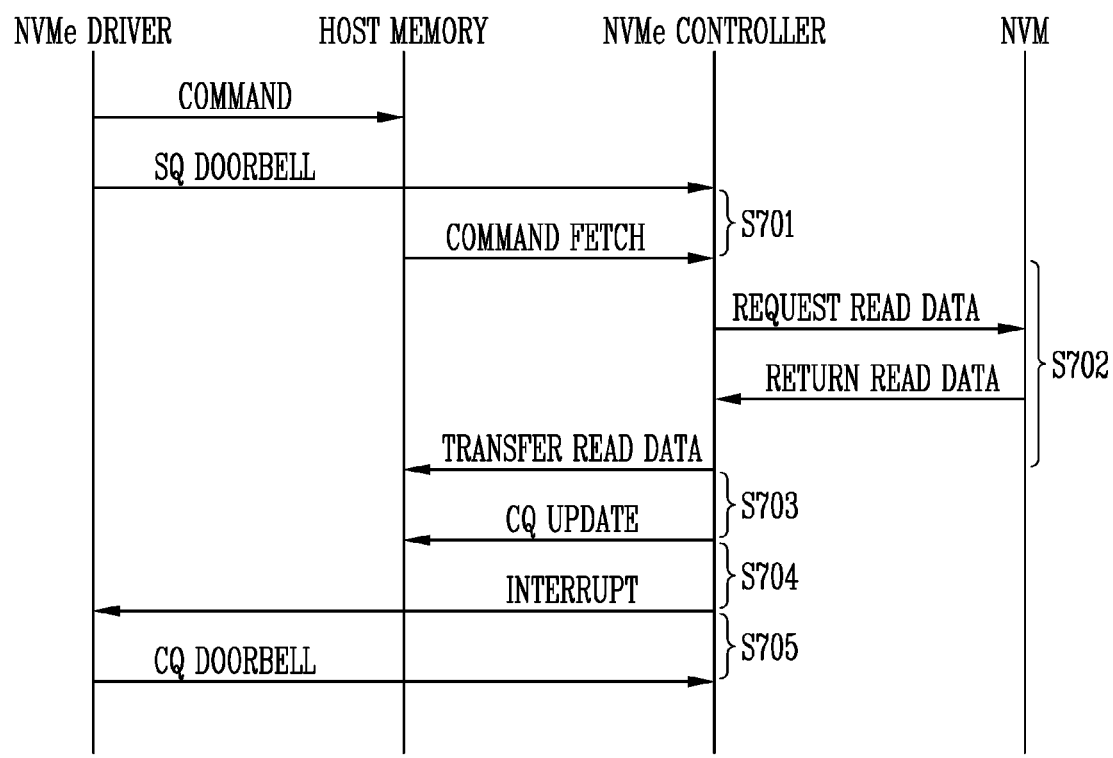
FIG. 7 illustrates an example of a process for processing a read command in a NVMe based on some implementations of the disclosed technology.

FIG. 7 is a diagram illustrating an embodiment of a process for processing the read command in the NVMe.

Referring to FIGS. 6 and 7, FIG. 7 shows an operation of a non-volatile memory (NVM) and the NVMe controller 500 of FIG. 6 that controls the NVM, which are included in the SSD which is any one of the NVMe devices connected to each of the NVMe driver 340 of FIG. 6, the host memory 330 of FIG. 6, the PCIe end points 150_1 and 150_2 of FIG. 1 or the legacy end points 160_1 and 160_2 of FIG. 1.

In an embodiment, the NVMe driver 340 may output the command COMMAND to be executed on the SSD to the host memory 330, and the host memory 330 may sequentially queue the received command from the HEAD to the TAIL of the SUBMISSION QUEUE.

Thereafter, the NVMe driver 340 may output the SQ DOORBELL signal to the NVMe controller 500. The SQ DOORBELL signal may be the same signal as the SUBMISSION QUEUE TAIL DOORBELL signal of FIG. 6. Thus, the NVMe driver 340 may output the SQ DOORBELL signal to the NVMe controller 500 so that a new command output from the host memory 330 is identified.

In an embodiment, the NVMe controller 500 may fetch the command from the host memory 330 (COMMAND FETCH). Thus, the NVMe controller 500 may receive the commands queued in the SUBMISSION QUEUE from the host memory 330 and perform operations corresponding to the received commands.

For example, in FIG. 7, since the command COMMAND to be executed on the SSD is the read command, the NVMe controller 500 may convert a logical block address (LBA) corresponding to the command into a physical block address (PBA), in response to the received command, and internally request read data to the NVM (REQUEST READ DATA). Thereafter, the NVMe controller 500 may receive the read data corresponding to the read data request from the NVM (RETURN READ DATA). In addition, the NVMe controller 500 may transmit the received read data to the host memory 330 (TRANSFER READ DATA). The NVMe driver 340 may perform an operation according to the received read data.

In an embodiment, after the SSD performs the operation corresponding to the commands, the NVMe controller 500 may update the COMPLETION QUEUE of the host memory 330 (CQ UPDATE). After the SSD performs the operation corresponding to the commands, the NVMe controller 500 may transmit the COMPLETION QUEUE ENTRY to the host memory 330, and the host memory 330 may sequentially queue the received COMPLETION QUEUE ENTRY from the HEAD to the TAIL of the COMPLETION QUEUE.

Thereafter, the SSD may output the INTERRUPT signal to the NVMe driver 340. The INTERRUPT signal may be a signal indicating that the COMPLETION QUEUE ENTRY is queued in the COMPLETION QUEUE.

In an embodiment, when the operation performed by the NVMe driver 340 based on the COMPLETION QUEUE ENTRY of the COMPLETION QUEUE is completed, the NVMe driver 340 may output a CQ DOORBELL signal to the SSD. The CQ DOORBELL signal may be the same signal as the COMPLETION QUEUE HEAD DOORBELL signal of FIG. 6. Thus, the NVMe driver 340 may output the CQ DOORBELL signal to the SSD so that the command of which the operation is completed is identified.

Thereafter, the NVMe driver 340 may output a new command COMMAND to be executed on the SSD to the host memory 330, and output the SQ DOORBELL signal to the SSD so that the new command output from the host memory 330 is identified.

In an embodiment, during a process of the read command, an idle time in which a state in which the packet is not transmitted and received through the link (LINK) may occurs. For example, the idle time may occur in any operation of S701 to S705.

In some implementations, the idle time may occur in any one or more operations that include 1) after the NVMe driver 340 outputs the SUBMISSION QUEUE TAIL DOORBELL signal and before fetching the command from the host memory 330 (COMMAND FETCH) (S701), 2) after fetching the command from the host memory 330 (COMMAND FETCH) and before transmitting the read data to the host memory 330 (S702), 3) after transmitting the read data to the host memory 330 and before updating the COMPLETION QUEUE (CQ UPDATE) (S703), 4) after updating the COMPLETION QUEUE (CQ UPDATE) and before outputting the INTERRUPT signal (S704), and/or 5) after outputting the INTERRUPT signal and before outputting the CQ DOORBELL signal (S705).

In an embodiment, when the PCIe link power management is not performed or entered even when the idle state in which the packet is not transmitted and received through the link (LINK) continues, power may not be efficiently supplied to the PCIe interface device 100 and the SSD. In the conventional art, power supply was not efficient since the PCIe link power management can be entered only in a case that the entry does not exist in the SUBMISSION QUEUE and the COMPLETION QUEUE included in the host memory 330 and that the unprocessed command does not exist in the PCIe interface device 100.

Therefore, in the disclosed technology, techniques are suggested to sense or detect the idle state of the PCIe link by the PCIe interface device 100 itself and enter the PCIe link power management in response to the detection of the idle state of the PCIe link. In some implementations, the PCIe interface device 100 is configured to end and wake up the PCIe link power management by itself.

Figure 8:
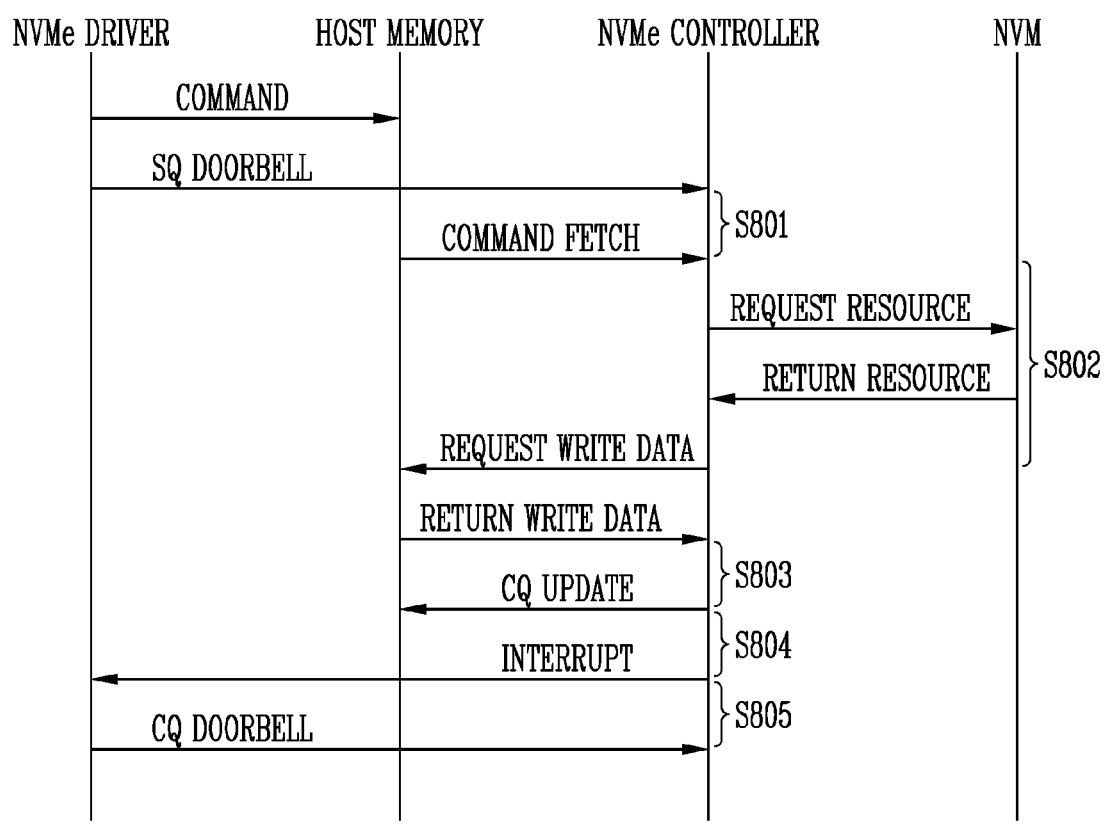
FIG. 8 illustrates an example of a process for processing a write command in a NVMe based on some implementations of the disclosed technology.

FIG. 8 is a diagram illustrating an embodiment of a process of the write command in the NVMe.

Referring to FIGS. 6 and 8, FIG. 8 shows an operation of the NVM and the NVMe controller 500 of FIG. 6 that controls the NVM, which are included in the SSD which is any one of the NVMe devices connected to each of the NVMe driver 340 of FIG. 6, the host memory 330 of FIG. 6, the PCIe end points 150_1 and 150_2 of FIG. 1 or the legacy end points 160_1 and 160_2 of FIG. 1.

In an embodiment, the NVMe driver 340 may output the command COMMAND to be executed on the SSD to the host memory 330, and the host memory 330 may sequentially queue the received command from the HEAD to the TAIL of the SUBMISSION QUEUE.

Thereafter, the NVMe driver 340 may output the SQ DOORBELL signal to the NVMe controller 500. The SQ DOORBELL signal may be the same signal as the SUBMISSION QUEUE TAIL DOORBELL signal of FIG. 6. That is, the NVMe driver 340 may output the SQ DOORBELL signal to the NVMe controller 500 so that a new command output from the host memory 330 is identified.

In an embodiment, the NVMe controller 500 may fetch the command from the host memory 330 (COMMAND FETCH). That is, the NVMe controller 500 may receive the commands queued in the SUBMISSION QUEUE from the host memory 330 and perform operations corresponding to the received commands.

For example, in FIG. 8, since the command COMMAND to be executed on the SSD is the write command, the NVMe controller 500 may request resource allocation to the NVM, in response to the received command (REQUEST RESOURCE). The NVM may allocate a resource and a temporary buffer memory internally in response to the resource allocation request. When the allocation of the resource and the temporary buffer memory is completed, the NVM may return the resource (RETURN RESOURCE).

The NVMe controller 500 may output a write data request to the host memory 330 in order to store write data corresponding to the write command in the temporary buffer memory (REQUEST WRITE DATA). In response to the write data request, the host memory 330 may return the write data to the NVMe controller 500 (RETURN WRITE DATA), and the NVMe controller 500 may store the received write data in the temporary buffer memory and then perform an operation corresponding to the write command.

In an embodiment, after the NVMe controller 500 stores the received write data in the temporary buffer memory, the NVMe controller 500 may update the COMPLETION QUEUE of the host memory 330 (CQ UPDATE). Thus, the NVMe controller 500 may transmit the COMPLETION QUEUE ENTRY to the host memory 330, and the host memory 330 may sequentially queue the received COMPLETION QUEUE ENTRY from the HEAD to the TAIL of the COMPLETION QUEUE.

Thereafter, the SSD may output the INTERRUPT signal to the NVMe driver 340. The INTERRUPT signal may be a signal indicating that the COMPLETION QUEUE ENTRY is queued in the COMPLETION QUEUE.

In an embodiment, when the operation performed by the NVMe driver 340 based on the COMPLETION QUEUE ENTRY of the COMPLETION QUEUE is completed, the NVMe driver 340 may output the CQ DOORBELL signal to the SSD. The CQ DOORBELL signal may be the same signal as the COMPLETION QUEUE HEAD DOORBELL signal of FIG. 6. Thus, the NVMe driver 340 may output the CQ DOORBELL signal to the SSD so that the command of which the operation is completed is identified.

Thereafter, the NVMe driver 340 may output a new command COMMAND to be executed on the SSD to the host memory 330, and output the SQ DOORBELL signal to the SSD so that the new command output from the host memory 330 is identified.

In an embodiment, an idle time in which a state in which the packet is not transmitted and received through the link (LINK) continues during a process of the write command may occur. For example, the idle time may occur in any operation of S801 to S805.

In some implementations, the idle time may occur in any one or more operations that include 1) after the NVMe driver 340 outputs the SUBMISSION QUEUE TAIL DOORBELL signal and before fetching the command from the host memory 330 (COMMAND FETCH) (S801), 2) after fetching the command from the host memory 330 (COMMAND FETCH) and before requesting the write data to the host memory 330 (S802), 3) after transmitting the write data to the host memory 330 and before updating the COMPLE- TION QUEUE (CQ UPDATE) (S803), 4) after updating the COMPLETION QUEUE (CQ UPDATE) and before outputting the INTERRUPT signal (S804), and/or after outputting the INTERRUPT signal and before outputting the CQ DOORBELL signal (S805).

In an embodiment, when the PCIe link power management is not performed or entered even when the idle state in which the state in which the packet is not transmitted and received through the link (LINK) continues, power may not be efficiently supplied to the PCIe interface device 100 and the SSD. In the conventional art, power supply was not efficient since the PCIe link power management may be entered only in a case that the entry does not exist in the SUBMISSION QUEUE and the COMPLETION QUEUE included in the host memory 330 and that the unprocessed command does not exist in the PCIe interface device 100.

Therefore, in the disclosed technology, techniques are suggested to sense or detect the idle state of the PCIe link by the PCIe interface device 100 itself and enter the PCIe link power management in response to the detection of the idle state of the PCIe interface link. In some implementations, then ends and wakes-up the PCIe link power management by itself, even in a case where the unprocessed command exists in the PCIe interface device 100, is presented.

Figure 9:
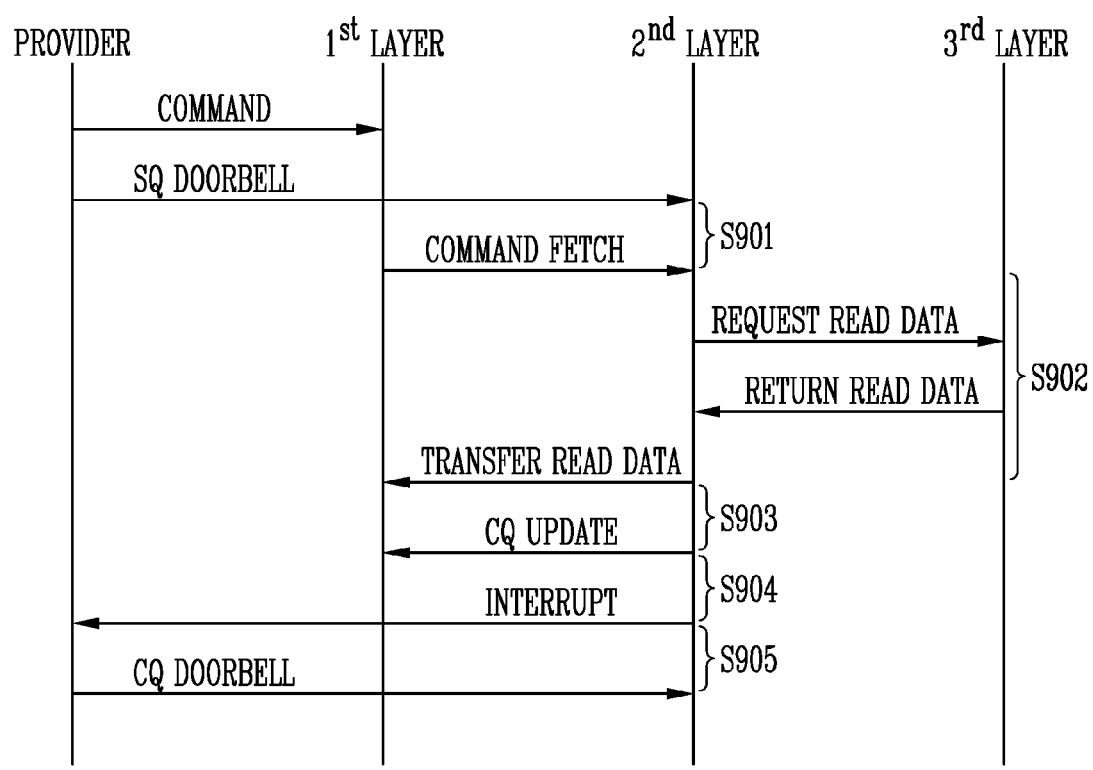
FIG. 9 illustrates an example of a process for processing a read command in a NVMe based on some implementations of the disclosed technology.

FIG. 9 is a diagram illustrating an embodiment of a process for processing the read command in the NVMe.

Referring to FIG. 9, FIG. 9 shows an operation between PROVIDER and first to third layers $1^{st}$ LAYER to $3^{rd}$ LAYER. In FIG. 9, the PROVIDER may be any one of components included in the host 300 of FIG. 1 or any one of components of the PCIe interface device 100 of FIG. 1.

In FIG. 9, the first to third layers $1^{st}$ LAYER to $3^{rd}$ LAYER may be any one among DEVICE PCIe LAYER including the host memory 330 of FIG. 6, DEVICE FTL LAYER of the NVM included in the SSD which is any one of the NVMe devices connected to each of the PCIe end points 150_1 and 150_2 of FIG. 1 or the legacy end points 160_1 and 160_2 of FIG. 1, and DEVICE NVMe LAYER including the NVMe controller 500 of FIG. 6 that controls the NVM.

In an embodiment, when the read command to be executed on the NVM is prepared in the first layer $1^{st}$ LAYER, in order to request a process of the corresponding read command, the PROVIDER may transmit an inbound write request packet (Downstream MemWr TLP) through the PCIe to transmit IO SQ tail update to the NVM.

In some implementations, the PROVIDER may output the command to be executed on the SSD to the first layer $1^{st}$ LAYER. For example, the NVMe driver 340 included in the PROVIDER may output the command COMMAND to the first layer $1^{st}$ LAYER, and the first layer $1^{st}$ LAYER may sequentially queue the received command from the HEAD to the TAIL of the SUBMISSION QUEUE.

Thereafter, the PROVIDER may output the SQ signal DOORBELL to the second layer $2^{nd}$ LAYER. For example, the NVMe driver 340 included in the PROVIDER may output the SQ DOORBELL signal to the NVMe controller 500. The SQ DOORBELL signal may be the same signal as the SUBMISSION QUEUE TAIL DOORBELL signal of FIG. 6. That is, the NVMe driver 340 included in the PROVIDER may output the SQ DOORBELL signal to the NVMe controller 500 so that a new command output from the first layer $1^{st}$ LAYER is identified.

In an embodiment, the second layer $2^{nd}$ LAYER may sense the IO SQ tail update, and transmit an outbound read request packet (Upstream MemRd TLP) through the PCIe to fetch the command from the first layer $1^{st}$ LAYER (COMMAND FETCH). That is, the NVMe controller 500 included in the second layer $2^{nd}$ LAYER may receive the commands queued in the SUBMISSION QUEUE from the first layer $1^{st}$ LAYER and perform operations corresponding to the received commands.

For example, in FIG. 9, since the command COMMAND to be executed on the SSD is the read command, the second layer $2^{nd}$ LAYER may convert the LBA corresponding to the command into the PBA and then internally request the read data to the third layer $3^{rd}$ LAYER (REQUEST READ DATA).

Thereafter, when the operation corresponding to the read command is internally completed, the read data may be stored in the temporary buffer memory of the NVM. In order to transmit the read data to the first layer $1^{st}$ LAYER, the NVM may transmit the read data by including the read data in an outbound write request packet (Upstream MemWr TLP) through the PCIe.

For example, the second layer $2^{nd}$ LAYER may receive the read data corresponding to the read data request from the third layer $3^{rd}$ LAYER of the NVM (RETURN DATA READ). In addition, the second layer $2^{nd}$ LAYER may transmit the received read data to the first layer $1^{st}$ LAYER (READ DATA TRANSFER). The PROVIDER may perform an operation according to the received read data.

In an embodiment, when the transmission of the read data to the first layer $1^{st}$ LAYER is completed, in order to transmit that the execution of the corresponding read command is successfully completed to the first layer $1^{st}$ LAYER, the NVM may transmit the COMPLETION QUEUE ENTRY through the PCIe by including the COMPLETION QUEUE ENTRY in the outbound write request packet (Upstream MemWr TLP).

For example, after the SSD performs the operation corresponding to the commands, the second layer 2nd LAYER may update the COMPLETION QUEUE of the first layer 1st LAYER (CQ UPDATE). After the SSD performs the operation corresponding to the commands, the second layer 2nd LAYER may transmit the COMPLETION QUEUE ENTRY to the first layer 1st LAYER, and the first layer 1st LAYER may sequentially queue the received COMPLETION QUEUE ENTRY from the HEAD to the TAIL of the COMPLETION QUEUE.

Thereafter, the NVM may output an INTERRUPT message to the PROVIDER by including the INTERRUPT message in the outbound write request packet (Upstream MemWr TLP) through the PCIe to inform the PROVIDER that the COMPLETION QUEUE ENTRY is newly transmitted.

For example, the second layer $2^{nd}$ LAYER may output the INTERRUPT signal to the PROVIDER. The INTERRUPT signal may be a signal informing the COMPLETION QUEUE that the COMPLETION QUEUE ENTRY is queued.

In an embodiment, in order to inform that the COMPLETION QUEUE ENTRY is received from the NVM and is processed, the PROVIDER may transmit the inbound write request packet (Downstream MemWr TLP) through the PCIe to transmit IO CQ head update to the NVM.

For example, when the PROVIDER completes an operation based on the COMPLETION QUEUE ENTRY of the COMPLETION QUEUE, the PROVIDER may output the CQ DOORBELL signal to the second layer $2^{nd}$ LAYER. The CQ DOORBELL signal may be the same signal as the COMPLETION QUEUE HEAD DOORBELL signal of FIG. 6. Thus, the PROVIDER may output the CQ DOOR- BELL signal to the SSD so that the command of which the operation is completed is identified.

Thereafter, the PROVIDER may output a new command COMMAND to be executed on the SSD to the first layer $1^{st}$ LAYER, and output the SQ DOORBELL signal to the second layer $2^{nd}$ LAYER so that the new command output from the first layer $1^{st}$ LAYER is identified.

In an embodiment, an idle time in which a state in which the packet is not transmitted and received through the link (LINK) occurs during a process of the read command. For example, the idle time may be generated in any operation of S901 to S905.

In some implementations, the idle time may occur in any one or more operations that include 1) after the PROVIDER outputs the SUBMISSION QUEUE TAIL DOORBELL signal and before fetching the command from the first layer $1^{st}$ LAYER (COMMAND FETCH) (S901), 2) after fetching the command from the first layer $1^{st}$ LAYER (COMMAND FETCH) and before transmitting the read data to the first layer $1^{st}$ LAYER (S902), 3) after transmitting the read data to the first layer $1^{st}$ LAYER and before updating the COMPLETION QUEUE (CQ UPDATE) (S903), 4) after updating the COMPLETION QUEUE (CQ UPDATE) and before outputting the INTERRUPT signal (S904), and/or 5) after outputting the INTERRUPT signal and before outputting the CQ DOORBELL signal (S905).

In an embodiment, when the PCIe link power management is not performed or entered even when the idle state in which the state in which the packet is not transmitted and received through the link (LINK) continues, power may not be efficiently supplied to the PCIe interface device 100 and the SSD. In the conventional art, power supply was not efficient since the PCIe link power management may be entered only in a case that the entry does not exist in the SUBMISSION QUEUE and the COMPLETION QUEUE included in the first layer $1^{st}$ LAYER and that the unprocessed command does not exist in the PCIe interface device 100.

Therefore, in the disclosed technology, techniques are suggested to sense or detect the idle state of the PCIe link by the PCIe interface device 100 itself and enter the PCIe link power management in response to the detection of the idle state of the PCIe link. In some implementations, the PCIe interface device 100 is configured to end and wake-up the PCIe link power management by itself.

Figure 10:
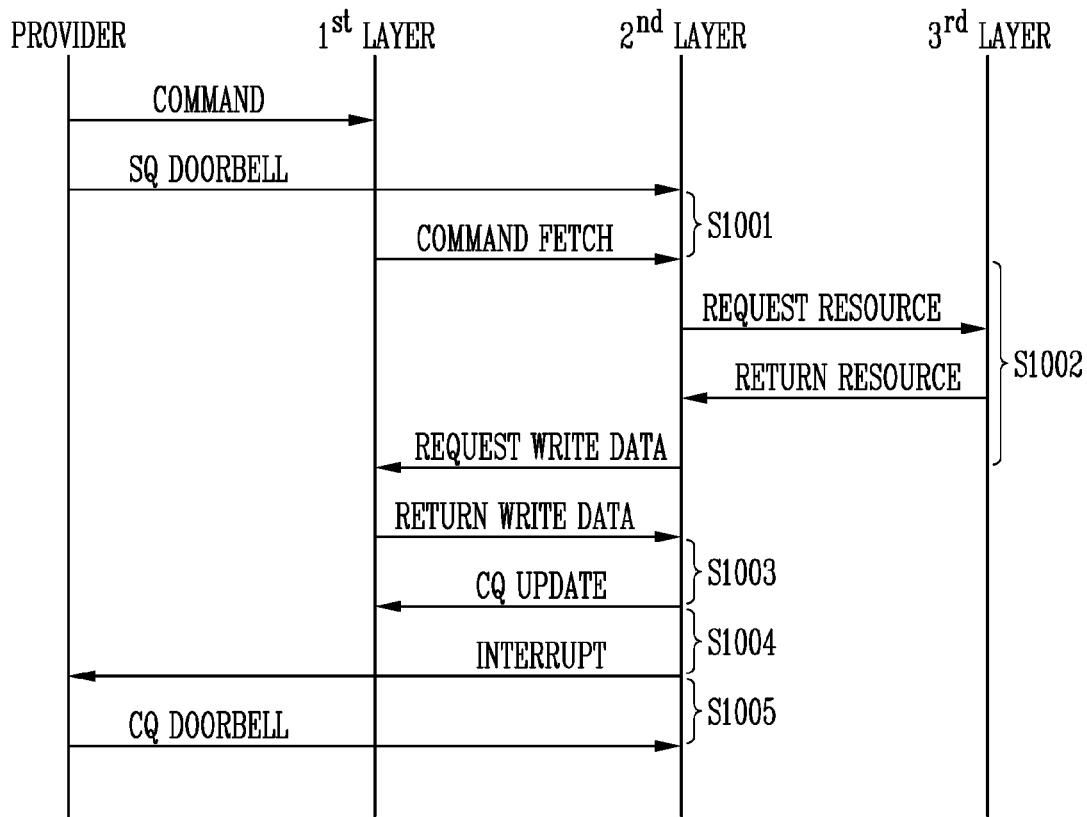
FIG. 10 illustrates an example of a process for processing write command in the NVMe.

FIG. 10 is a diagram illustrating an embodiment of a process for processing the write command in the NVMe.

Referring to FIG. 10, FIG. 10 shows an operation between the PROVIDER and the first to third layers $1^{st}$ LAYER to $3^{rd}$ LAYER. In FIG. 10, the PROVIDER may be any one of the components included in the host 300 of FIG. 1 or any one of the components of the PCIe interface device 100 of FIG. 1.

In FIG. 10, the first to third layers $1^{st}$ LAYER to $3^{rd}$ LAYER may be any one among the DEVICE PCIe LAYER including the host memory 330 of FIG. 6, the DEVICE FTL LAYER of the NVM included in the SSD which is any one of the NVMe devices connected to each of the PCIe end points 150_1 and 150_2 of FIG. 1 or the legacy end points 160_1 and 160_2 of FIG. 1, and the DEVICE NVMe LAYER including the NVMe controller 500 of FIG. 6 that controls the NVM.

In an embodiment, when the write command to be executed on the NVM is prepared in the first layer $1^{st}$ LAYER, in order to request a process of the corresponding write command, the PROVIDER may transmit the inbound write request packet (Downstream MemWr TLP) through the PCIe to transmit the IO SQ tail update to the NVM.

Specifically, the PROVIDER may output the command to be executed on the SSD to the first layer $1^{st}$ LAYER. For example, the NVMe driver 340 included in the PROVIDER may output the command COMMAND to the first layer $1^{st}$ LAYER, and the first layer $1^{st}$ LAYER may sequentially queue the received command from the HEAD to the TAIL of the SUBMISSION QUEUE.

Thereafter, the PROVIDER may output the SQ signal DOORBELL to the second layer $2^{nd}$ LAYER. Specifically, the NVMe driver 340 included in the PROVIDER may output the SQ DOORBELL signal to the NVMe controller 500. The SQ DOORBELL signal may be the same signal as the SUBMISSION QUEUE TAIL DOORBELL signal of FIG. 6. That is, the NVMe driver 340 included in the PROVIDER may output the SQ DOORBELL signal to the NVMe controller 500 so that the new command output from the first layer $1^{st}$ LAYER is identified.

In an embodiment, the second layer $2^{nd}$ LAYER may sense the IO SQ tail update, and transmit the outbound read request packet (Upstream MemRd TLP) through the PCIe to fetch the command from the first layer $1^{st}$ LAYER (COMMAND FETCH). That is, the NVMe controller 500 included in the second layer $2^{nd}$ LAYER may receive the commands queued in the SUBMISSION QUEUE from the first layer $1^{st}$ LAYER and perform operations corresponding to the received commands.

For example, in FIG. 10, since the command COMMAND to be executed on the SSD is the write command, the second layer $2^{nd}$ LAYER may request resource allocation to the NVM, in response to the received command (REQUEST RESOURCE). The NVM may allocate the resource and the temporary buffer memory internally in response to the resource allocation request. When the allocation of the resource and the temporary buffer memory is completed internally, the second layer $2^{nd}$ LAYER may return the resource (RETURN RESOURCE).

In an embodiment, the second layer $2^{nd}$ LAYER may output the write data request to the first layer $1^{st}$ LAYER in order to store the write data corresponding to the write command in the temporary buffer memory (REQUEST WRITE DATA). In response to the write data request, the first layer $1^{st}$ LAYER may return the write data to the second layer $2^{nd}$ LAYER (RETURN WRITE DATA), and the second layer $2^{nd}$ LAYER may store the received write data in the temporary buffer memory and then perform the operation corresponding to the write command.

In an embodiment, when the storage of the write data in the temporary buffer memory (or the NVM) is completed, in order to transmit that the execution of the corresponding command is successfully completed to the first layer $1^{st}$ LAYER, the second layer $2^{nd}$ LAYER may transmit the COMPLETION QUEUE ENTRY through the PCIe by including the COMPLETION QUEUE ENTRY in the outbound write request packet (Upstream MemWr TLP).

For example, after the second layer 2nd LAYER stores the received write data in the temporary buffer memory, the second layer 2nd LAYER may update the COMPLETION QUEUE of the first layer 1st LAYER (CQ UPDATE). That is, the second layer 2nd LAYER may transmit the COMPLETION QUEUE ENTRY to DEVICE PCIe LAYER, and the first layer 1st LAYER may sequentially queue the received COMPLETION QUEUE ENTRY from the HEAD to the TAIL of the COMPLETION QUEUE.

Thereafter, the NVM may output the INTERRUPT message to the PROVIDER by including the INTERRUPT message in the outbound write request packet (Upstream MemWr TLP) through the PCIe to inform the PROVIDER that the COMPLETION QUEUE ENTRY is newly transmitted.

For example, the second layer $2^{nd}$ LAYER may output the INTERRUPT signal to the PROVIDER. The INTERRUPT signal may be a signal informing the COMPLETION QUEUE that the COMPLETION QUEUE ENTRY is queued.

In an embodiment, in order to inform that the COMPLETION QUEUE ENTRY is received from the NVM and is processed, the PROVIDER may transmit the inbound write request packet (Downstream MemWr TLP) through the PCIe to transmit the IO CQ head update to the NVM.

For example, when the PROVIDER completes the operation based on the COMPLETION QUEUE ENTRY of the COMPLETION QUEUE, the PROVIDER may output the CQ DOORBELL signal to the SSD. The CQ DOORBELL signal may be the same signal as the COMPLETION QUEUE HEAD DOORBELL signal of FIG. 6. That is, the PROVIDER may output the CQ DOORBELL signal to the SSD so that the command of which the operation is completed is identified.

Thereafter, the PROVIDER may output the new command COMMAND to be executed on the SSD to the DEVICE PCIe LAYER, and output the SQ DOORBELL signal to the SSD so that the new command output from the DEVICE PCIe LAYER is identified.

In an embodiment, an idle time in which the packet is not transmitted and received through the link (LINK) occurs during a process of the write command. For example, the idle time may occur in any operation of S1001 to S1005.

In some implementations, the idle time may occur in any one or more operations that include 1) after the PROVIDER outputs the SUBMISSION QUEUE TAIL DOORBELL signal and before fetching the command from the first layer $1^{st}$ LAYER (COMMAND FETCH) (S1001), 2) after fetching the command from the first layer $1^{st}$ LAYER (COMMAND FETCH) and before requesting the write data to the first layer $1^{st}$ LAYER (S1002), 3) after transmitting the write data to the second layer $2^{nd}$ LAYER and before updating the COMPLETION QUEUE (CQ UPDATE) (S1003), 4) after updating the COMPLETION QUEUE (CQ UPDATE) and before outputting the INTERRUPT signal (S1004), and/or 5) after outputting the INTERRUPT signal and before outputting the CQ DOORBELL signal (S1005).

In an embodiment, when the PCIe link power management is not performed or entered even when the idle state in which the state in which the packet is not transmitted and received through the link (LINK) continues, power may not be efficiently supplied to the PCIe interface device 100 and the SSD. In the conventional art, power supply was not efficient since the PCIe link power management can be entered only in a case that the entry does not exist in the SUBMISSION QUEUE and the COMPLETION QUEUE included in the host memory 330 and that the unprocessed command does not exist in the PCIe interface device 100.

Therefore, in the disclosed technology, techniques are suggested to sense or detect the idle state of the PCIe link by the PCIe interface device 100 itself and enter the PCIe link power management in response to the detection of the idle state of the PCIe link. In some implementations, the PCIe interface device 100 is configured to end and wake-up the PCIe link power management by itself.

Figure 11:
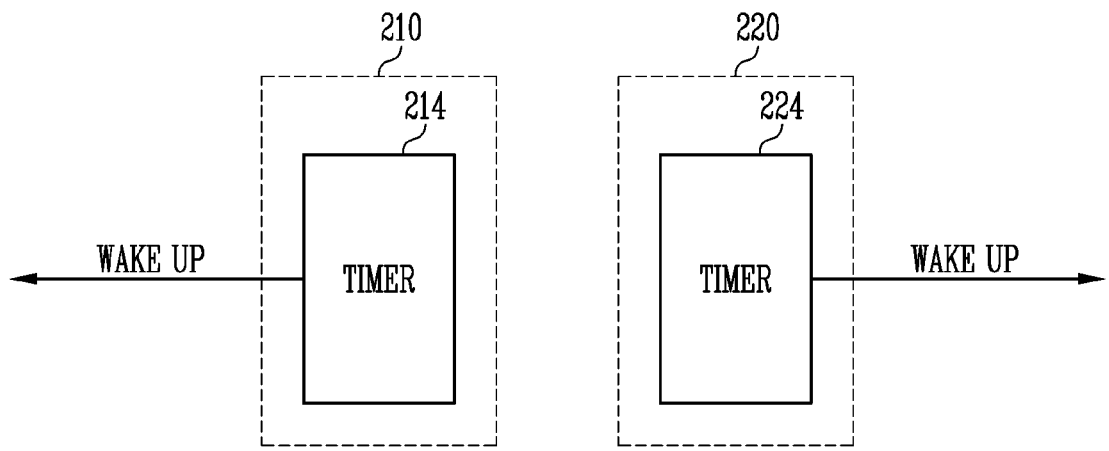
FIG. 11 illustrates timers included in the PCIe interface device.

FIG. 11 illustrates timers included in the PCIe interface device.

Referring to FIGS. 3 and 11, FIG. 11 shows timers 214 and 224 included in the PCI components 210 and 220 of FIG. 3, respectively. The timers 214 and 224 may be included in the transaction layers 211 and 221, the data link layers 212 and 222, or the physical layers 213 and 223, or may not be included in the transaction layers 211 and 221, the data link layers 212 and 222, or the physical layers 213 and 223 and may be positioned outside.

In an embodiment, the timers 214 and 224 may sense or detect time in which the state in which the packet is not transmitted and received through the link (LINK) of the PCIe continues. Thus, the timers 214 and 224 may sense or detect the idle state of the link (LINK). For example, the timers 214 and 224 may sense or detect the idle state in S701 to S705 of FIG. 7, S801 to S805 of FIG. 8, S901 to S905 of FIG. 9, or S1001 to S1005 of FIG. 10.

In an embodiment, when the timers 214 and 224 sense or detect the state in which the packet is not transmitted and received through the link (LINK) during a preset reference time, the PCIe interface device 100 of FIG. 1 may automatically enter the PCIe link power management. The PCIe interface device 100 of FIG. 1 may be changed to the L1 state of FIG. 5 after the PCIe link power management.

Thereafter, when the timers 214 and 224 sense or detect that the state in which the packet is not transmitted and received through the link (LINK) during the preset reference time again, the PCIe interface device 100 of FIG. 1 may be changed to the L1.2 state. The L1.2 state may be the sub state of the L1 state. The L1.2 state may be a state in which a link common mode voltage is not required to be maintained and there is no need to activate an upstream port and a downstream port to sense or detect release of the idle state.

In an embodiment, when the PCIe interface device 100 of FIG. 1 enters a state capable of performing an operation such as fetching the command from the host memory 330 (COMMAND FETCH) and the idle state of the link (LINK) is released, the timers 214 and 224 may output a WAKE UP signal to be changed to the L0 state. That is, when a state in which the packet may be transmitted and received through the link (LINK) is reached, based on the WAKE UP signal, the PCIe link power management may be ended, and the transaction layers 211 and 221, the data link layers 212 and 222, or the physical layers 213 and 223 may perform an operation again. As the PCIe link power management is ended, the PCIe interface device 100 of FIG. 1 may be changed from the L1 state or L1.2 state to the L0 state.

Thereafter, when the PCIe interface device 100 of FIG. 1 performs an operation such as fetching the command from the host memory 330 (COMMAND FETCH), the timers 214 and 224 may be reset. That is, when the packet is transmitted and received through the link (LINK), the timers 214 and 224 may be reset. When the timers 214 and 224 are reset, the timers 214 and 224 may sense or detect the state in which the packet is not transmitted and received through the link (LINK) during the preset reference time.

In another embodiment, contents described above may be applied to a processor (ex. Admin command) corresponding to a command other than the read command or the write command). In addition, more power may be saved by partially managing power according to a command lifetime not only the PCIe link power management, but also a host layer, an FTL layer, and the like inside a device. Furthermore, even though the host 300 of FIG. 1 outputs CQ head update late, the PCIe link power management may be performed in advance.

As a result, power can be efficiently supplied by performing the PCIe link power management even during a process of the command.

FIG. 12 is a diagram illustrating an operation of a PCIe interface device according to an embodiment of the disclosed technology.

Referring to FIG. 12, in step S1201, the PCIe interface device may sense or detect the idle time. The idle time may be a preset reference time, and may be a time in which the state in which the packets is not transmitted and received through the PCIe link (LINK) continues.

When the PCIe interface device senses or detects the idle time, in step S1203, the PCIe interface device may enter the L1 state after the PCIe link power management. The L1 state may have a speed for returning to the L0 state lower than that of the L0 state, but may be a state in which additionally greater power may be saved compared to the L0 state through an additional resume latency in the L1 state.

In step S1205, the PCIe interface device may determine whether the idle time is sensed or detected again. When the idle time is not sensed or detected (N), the operation proceeds to step S1209, and when the idle time is sensed or detected (Y), the operation proceeds to step S1207.

In step S1207, the PCIe interface device may enter the L1.2 state. The L1.2 state may be the sub state of the L1 state. The L1.2 state may be a state in which a link common mode voltage is not required to be maintained and there is no need to activate an upstream port and a downstream port to sense or detect the release of the idle state.

In step S1209, the PCIe interface device may wake up to the L0 state. That is, when a state in which an operation such as fetching the command is performed is reached and the idle state of the PCIe link (LINK) is not sensed or detected, the PCIe interface device may be woken up to perform an operation.

Thereafter, when the operation such as fetching the command is completed, the timer may be reset in step S1211.

While various embodiments have been described above, variations and improvements of the disclosed embodiments and other embodiments may be made based on what is described or illustrated in this document.

What is claimed is:

1. A peripheral component interconnect express (PCIe) interface device comprising:
    a root complex configured to support a PCIe port;
    a memory connected to an input/output structure through the root complex;
    a switch connected to the root complex through a link and configured to transmit a transaction; and
    an end point connected to the switch through the link to transmit and receive a packet,
    wherein the PCIe interface device is configured to perform a link power management by changing a state of the link in response to a detection of a first idle state of the link, enter an L1 state after performing the link power management, and enter an L1.2 state from the L1 state in response to detecting a second idle state of the link.

2. The PCIe interface device of claim 1, wherein the PCIe interface device is configured to detect the first idle state of the link based on whether the packet is being transmitted and received through the link.

3. The PCIe interface device of claim 1, further comprising a timer configured to measure a period in which no packet is transmitted and received through the link to detect the first idle state of the link, wherein the timer is configured to detect the first idle state in response to the period exceeding a preset reference time.

4. The PCIe interface device of claim 1, wherein the PCIe interface device is configured to perform the link power management regardless of whether data exists in the memory.

5. The PCIe interface device of claim 1, wherein the first idle state and the second idle state are continuous.

6. The PCIe interface device of claim 1, further comprising a timer configured to measure a period in which no packet is transmitted and received through the link to detect the first idle state of the link, wherein the timer is configured to output a wake up signal for changing from the L1 state to an L0 state in response to a release of the first idle state of the link.

7. The PCIe interface device of claim 6, wherein the PCIe interface device is configured to end the link power management based on the wake up signal.

8. The PCIe interface device of claim 6, wherein the packet is transmitted or received through the link based on the wake up signal.

9. The PCIe interface device of claim 8, wherein the timer is configured to be reset in response to a transmission or a reception of the packet through the link.

10. A method of operating a peripheral component interconnect express (PCIe) interface device, the method comprising:
    detecting an idle state of a link configured to transmit and receive a packet based on a measurement of a period in which no packet is transmitted and received through the link;
    performing a link power management by changing a state of the link in response to the detecting of the idle state of the link;
    entering an L1 state after performing the link power management; and
    entering from the L1 state to an L1.2 state when another idle state of the link is detected.

11. The method of claim 10, wherein the detecting the idle state is performed in response to the period exceeding a preset reference time.

12. The method of claim 10, wherein the link power management is performed regardless of whether data exists in a memory of the PCIe interface device.

13. The method of claim 10, further comprising:
    outputting a wake up signal for changing from the L1 state to an L0 state in response to a release of the idle state of the link.

14. The method of claim 13, further comprising:
    ending the link power management based on the wake up signal.

15. The method of claim 13, further comprising:
    transmitting or receiving the packet through the link based on the wake up signal.

16. The method of claim 15, wherein the PCIe interface device includes a timer configured to measure the period in which no packet is transmitted and received through the link and be reset when the packet is transmitted and received through the link.

* * * * *